(12) United States Patent
Baek (10) Patent No.: US 9,105,948 B2
(45) Date of Patent: Aug. 11, 2015

(54) BATTERY PACK

(75) Inventor: Woon-Seong Baek, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 433 days.

(21) Appl. No.: 13/045,828

(22) Filed: Mar. 11, 2011

(65) Prior Publication Data

US 2012/0064376 A1    Mar. 15, 2012

(30) Foreign Application Priority Data

Sep. 14, 2010 (KR) .................. 10-2010-0089909

(51) Int. Cl.
| | |
|---|---|
| H01M 14/00 | (2006.01) |
| H01M 10/42 | (2006.01) |
| H01M 2/02 | (2006.01) |
| H01M 2/30 | (2006.01) |
| H01M 2/04 | (2006.01) |
| H01M 2/26 | (2006.01) |

(52) U.S. Cl.
CPC .......... *H01M 10/425* (2013.01); *H01M 2/0212* (2013.01); *H01M 2/0473* (2013.01); *H01M 2/30* (2013.01); *H01M 2/263* (2013.01); *H01M 2200/00* (2013.01)

(58) Field of Classification Search
CPC ... H01M 2/00; H01M 2/0212; H01M 2/0217; H01M 2/06; H01M 2/0473; H01M 2/30; H01M 2/26; H01M 10/4257; H01M 10/0431; H01M 10/0459; H01M 10/0425; H01M 2010/0425; H01M 2200/003
USPC ...................................................... 429/7, 65
See application file for complete search history.

(56) References Cited

U.S. PATENT DOCUMENTS

| | | | | |
|---|---|---|---|---|
| 6,461,757 | B1 * | 10/2002 | Sasayama et al. | 429/59 |
| 2006/0019531 | A1 | 1/2006 | Moon | |
| 2006/0172190 | A1 * | 8/2006 | Kaplin et al. | 429/161 |
| 2006/0215334 | A1 * | 9/2006 | Hong et al. | 361/15 |
| 2006/0216585 | A1 * | 9/2006 | Lee | 429/162 |
| 2006/0257729 | A1 * | 11/2006 | Lee | 429/174 |
| 2007/0264535 | A1 | 11/2007 | Lee et al. | |
| 2008/0233472 | A1 * | 9/2008 | Ota et al. | 429/122 |
| 2008/0261087 | A1 | 10/2008 | Jang et al. | |

(Continued)

FOREIGN PATENT DOCUMENTS

| | | |
|---|---|---|
| KR | 10-0604276 | 7/2006 |
| KR | 1020060118961 | 11/2006 |

(Continued)

OTHER PUBLICATIONS

Korean Office action issued by KIPO on Dec. 20, 2011, corresponding to KR 10-2010-0089909 and Request for Entry attached herewith.

(Continued)

*Primary Examiner* — Ula C Ruddock
*Assistant Examiner* — Lisa S Park Gehrke
(74) *Attorney, Agent, or Firm* — Robert E. Bushnell, Esq.

(57) ABSTRACT

A pouch-type battery pack that includes a bare cell, a protection circuit module and a top case. The bare cell has a plurality of electrode leads extending to the exterior of the bare cell. The protection circuit module is provided with electrode terminals that come in contact with the electrode leads, respectively. The top case is coupled to the bare cell while surrounding the protection circuit module.

19 Claims, 8 Drawing Sheets

(56) References Cited

U.S. PATENT DOCUMENTS

| | | | |
|---|---|---|---|
| 2008/0292955 A1* | 11/2008 | Byun et al. | 429/163 |
| 2009/0081485 A1 | 3/2009 | Heo | |
| 2009/0081538 A1* | 3/2009 | Moon | 429/178 |
| 2009/0087734 A1* | 4/2009 | Akatsuchi et al. | 429/178 |
| 2009/0297942 A1 | 12/2009 | Jang et al. | |
| 2010/0092859 A1 | 4/2010 | Kim et al. | |
| 2010/0209768 A1 | 8/2010 | Ahn et al. | |

FOREIGN PATENT DOCUMENTS

| | | |
|---|---|---|
| KR | 1020090126092 | 12/2009 |
| KR | 10-2010-0041689 A | 4/2010 |

OTHER PUBLICATIONS

Korean Notice of Allowance issued May 19, 2012 in connection with Korean Patent Application Serial No. 10-2010-0089909 and Request for Entry of the Accompanying Office Action attached herewith.

* cited by examiner

BATTERY PACK

CLAIM OF PRIORITY

This application makes reference to, incorporates the same herein, and claims all benefits accruing under 35 U.S.C. §119 from an application earlier filed in the Korean Intellectual Property Office on Sep. 14, 2010 and there duly assigned Ser. No. 10-2010-0089909.

BACKGROUND OF THE INVENTION

1. Field of the Invention

The general inventive concept of the present invention relates to a battery pack.

2. Description of the Related Art

Battery packs are generally classified into a hard battery pack and an inner battery pack based on how a secondary battery is mounted to a case. The hard battery pack forms a part of an electronic device to which the battery pack is mounted. On the other hand, the inner battery pack is covered with a separate cover in the state that it is mounted in the interior of an electronic device.

The inner battery pack has recently been widely used because of advantages of easy design, cheap manufacturing cost and high compatibility.

The above information disclosed in this Related Art section is only for enhancement of understanding of the background of the invention and therefore it may contain information that does not form the prior art that is already known to a person of ordinary skill in the art.

SUMMARY OF THE INVENTION

Embodiments provide a simplified joining method among a bare cell, a protection circuit module attached to the bare cell and a top case for protecting the protection circuit module.

Embodiments also provide a battery pack for stabilizing electrical connection between a bare cell and a protection circuit module.

According to an aspect of the present invention, there may be provided a pouch-type battery pack including: a bare cell having one or more electrode leads extracted to the exterior thereof; a molding portion formed at one side of the bare cell in a direction in which the one or more electrode leads are extracted; and a top portion having a protection circuit module electrically connected to the bare cell, wherein the top portion has one or more electrode terminals physically adhered to closely to the one or more electrode leads of the bare cell.

The one or more electrode leads of the bare cell may be elastically adhered closely to the one or more electrode terminals in the state that they are bent.

The one or more electrode terminals may be elastic bodies formed to be protruded toward the one or more electrode leads.

The top portion may include a top case that surrounds the protection circuit module, and the one or more electrode terminals may be formed to be extended from one side of the protection circuit module.

The molding portion may include a base on which the protection circuit module is mounted, and a sidewall portion that is extended from the base and is a region in which the one or more electrode leads are extracted.

The sidewall portion may be provided with one or more stepped portions on the region in which the one or more electrode leads are extracted so that the one or more electrode leads are easily bent.

The sidewall portion may be fastened and coupled to the top case.

The base may be provided with one or more support portions that support the protection circuit module. A reverse-insertion preventing rib may be formed on the one or more support portions, and a recess may be formed at a position corresponding to the reverse-insertion preventing rib in the protection circuit module so that the reverse-insertion preventing rib is coupled to the recess while being matched with the recess.

A cutout portion may be provided to both sides of the region in which the one or more electrode leads are extracted. The sidewall portion having the cutout portion positioned therein may enable the one or more electrode leads of the protection circuit module to be moved when the one or more electrode leads come in contact with the one or more electrode leads.

The molding portion may further include one or more side portions extended in the length direction of the bare cell from the base and the sidewall portion.

As described above, according to embodiments of the present invention, a bare cell, a protection circuit module attached to the bare cell and a top case for protecting the protection circuit module are joined together using a simple method, thereby improving processing efficiency.

Also, since the position of the protection circuit module is fixed, it is possible to stabilize electrical connection between the bare cell and the protection circuit module.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on another element or be indirectly on another element with one or more intervening elements interposed therebetween. Also, when an element is referred to as being "connected to" another element, it can be directly connected to another element or be indirectly connected to another element with one or more intervening elements interposed therebetween. Hereinafter, like reference numerals refer to like elements.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. In order to clarify the present invention, elements extrinsic to the description are omitted from the details of this description, and like reference numerals refer to like elements throughout the specification.

Hereinafter, configurations and operations of exemplary embodiments according to the present invention will be described in detail with reference with the accompanying drawings.

Figure 1:
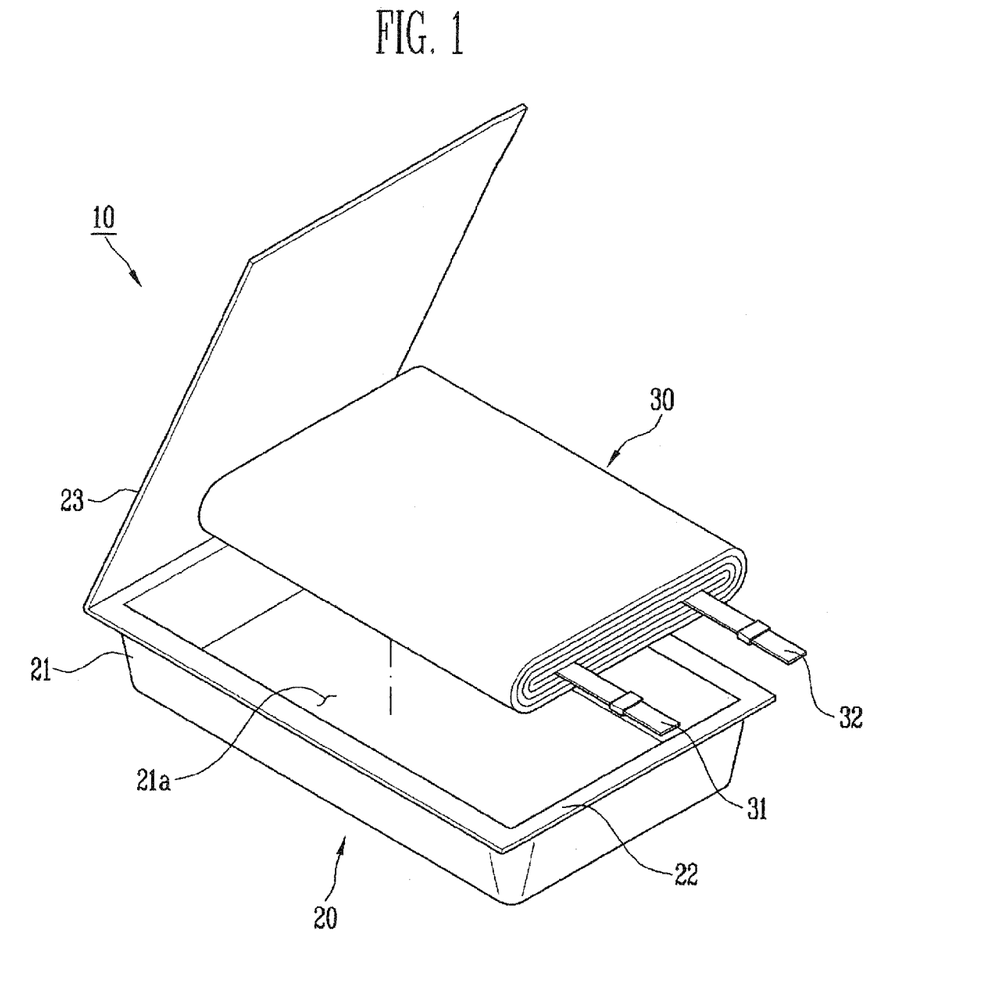
FIG. 1 is an exploded perspective view of a bare cell according to an embodiment of the present invention.

FIG. 1 is a perspective view of a bare cell applied to an embodiment of the present invention.

Referring to FIG. 1, a battery pack according to this embodiment includes an electrode assembly 30 provided with a plurality of electrode leads 31 and 32, and an outer casing 20 that accommodates the electrode assembly 30 so that the plurality of electrode leads 31 and 32 are exposed to the exterior of the bare cell 10.

The electrode assembly 30 may be formed by spirally winding or alternately stacking a positive electrode plate, a negative electrode plate and a separator interposed therebetween. At this time, one or more, preferably a plurality of electrode leads 31 and 32 may be attached to the positive and negative electrode plates. The plurality of electrode leads 31 and 32 may be extracted perpendicular to the wound or stacked direction of the electrode assembly 30. Thus, the electrode assembly 30 may be electrically connected to the exterior of the battery pack by the plurality of electrode leads 31 and 32. The pouch-type bare cell 10 according to this embodiment may be formed by accommodating the electrode assembly 30 and an electrolyte in the outer casing 20 and then sealing the outer casing 20.

Meanwhile, in the bare cell 10 according to this embodiment, the outer casing 20 that accommodates the electrode assembly 30 may be a pouch configured as a body 21 and a cover 22. The body 21 is provided with an accommodating portion 21a that is a space for accommodating the electrode assembly 30, and a fusing portion 22 formed in a flange shape along the circumference of the accommodating portion 21a. The cover 23 may be formed to be integrally connected to one side of the fusing portion 22. The bare cell 10 may be manufactured by disposing the electrode assembly 30 in the accommodating portion 21a of the body 21 and then thermally fusing the fusing portion 22 in the state that the body 21 and the cover 23 are adhered closely to each other.

Figure 2:
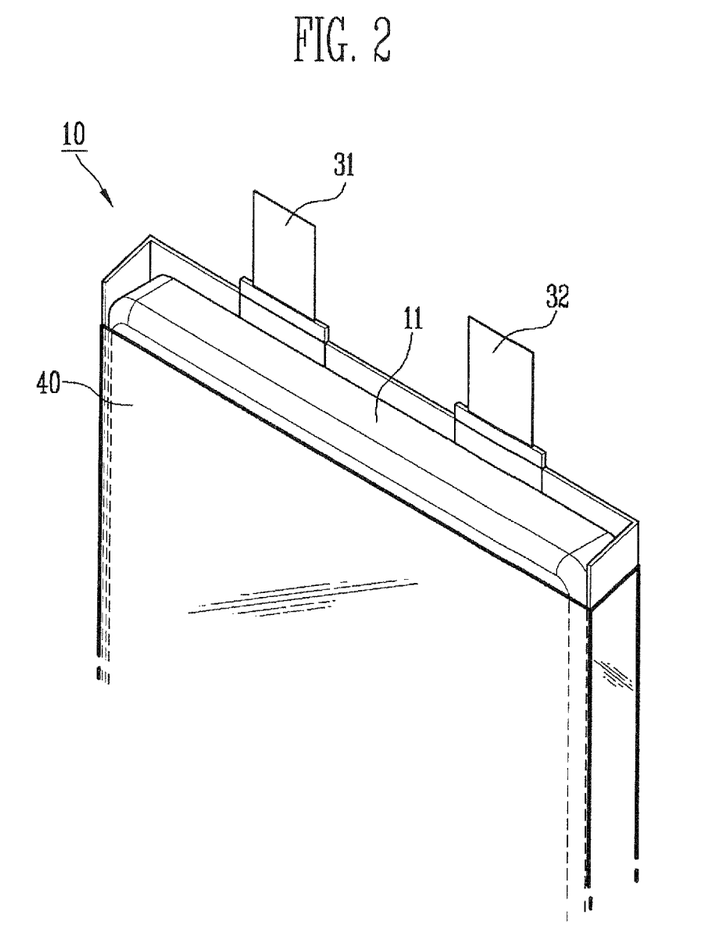
FIG. 2 is an assembled perspective view of the bare cell according to the embodiment of the present invention.

FIG. 2 is an assembled perspective view of the bare cell according to the embodiment of the present invention.

Referring to FIG. 2, in the battery pack according to this embodiment, portions of the fusing portion 22 (see FIG. 1), which are both side portions of the outer casing 20 (see FIG. 1), are folded and a taping operation is performed with respect to an outer surface of the bare cell 10 using a tape 40. A mounting space 11 having a protection circuit module, which will be described later, mounted therein is provided to a side from which the plurality of electrode leads 31 and 32. An insulating member such as an insulating tape may be generally provided to the mounting space 11. The insulating member is used to prevent a short circuit between the electrode leads 31 and 32 and the outer casing 20 (see FIG. 1). Meanwhile, in a case where a molding portion is formed at the end portion of the bare cell 10, from which the plurality of electrode leads 31 and 32, including the mounting space 11, the attaching process of the insulating tape or the like may be omitted. The bare cell having the molding portion formed therein will be described in a more detailed manner with reference to FIGS. 3A and 3B.

Figure 3A:
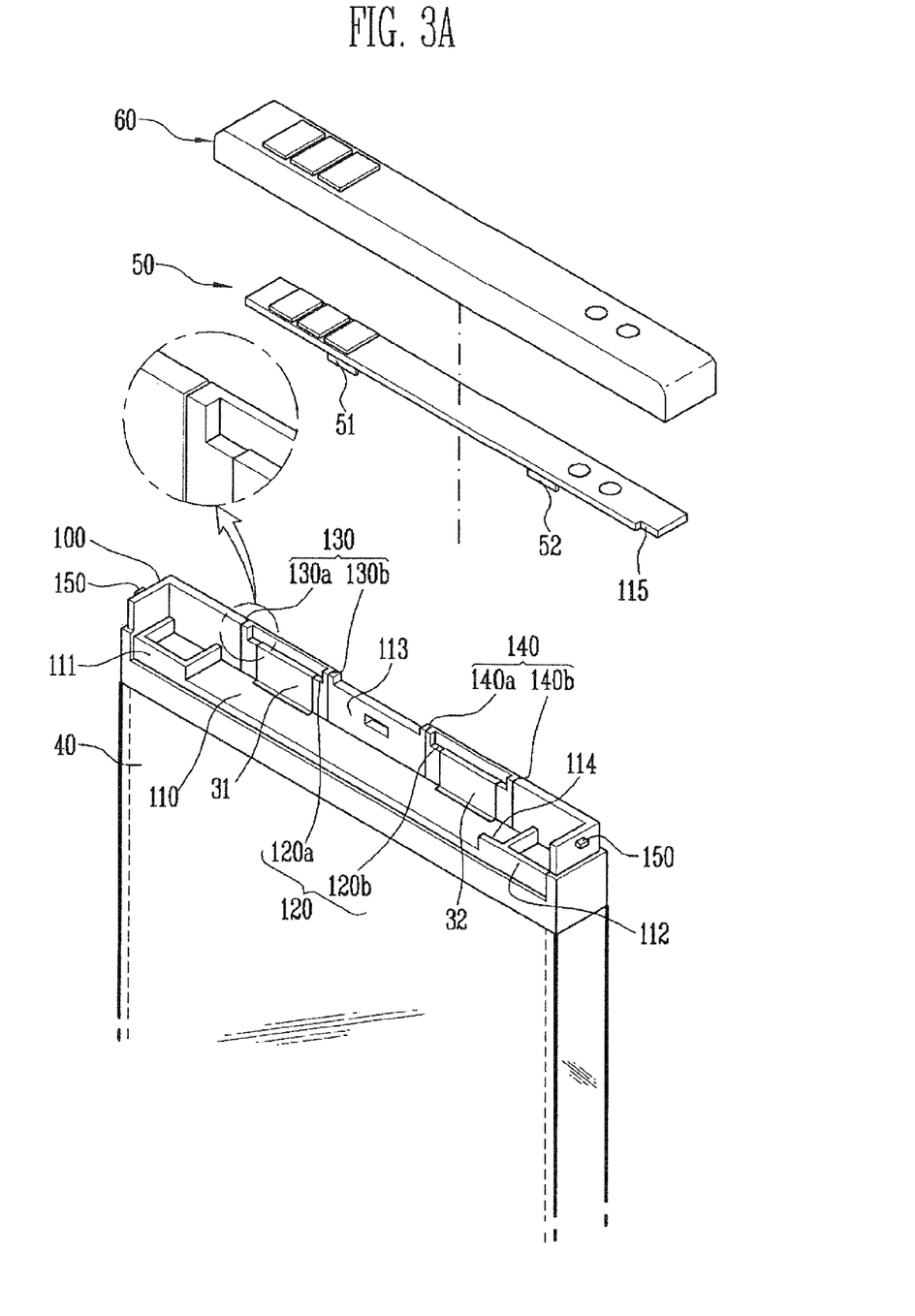
FIG. 3A is an exploded perspective view of a battery pack according to the embodiment of the present invention.
Figure 3B:
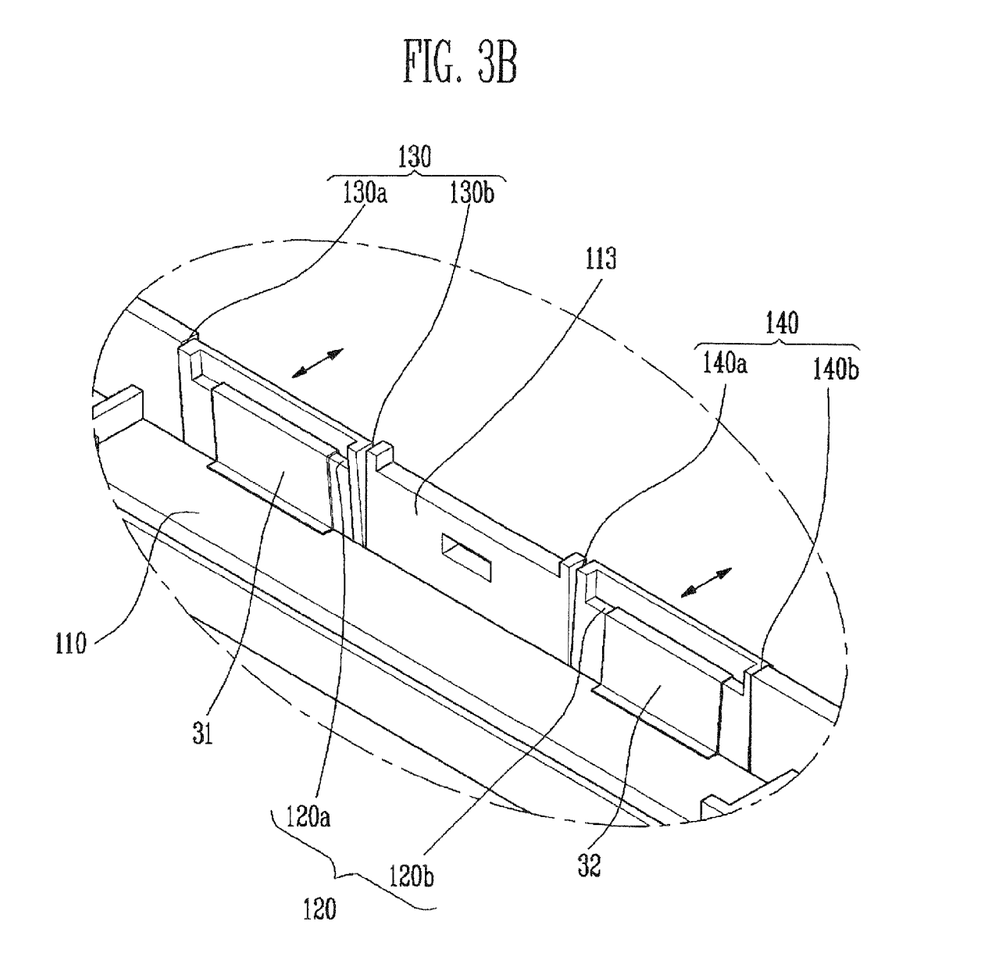
FIG. 3B is an enlarged view of a portion of the battery pack shown in FIG. 3A.

FIG. 3A is an exploded perspective view of the battery pack for joining a protection circuit module to the bare cell of FIG. 2 according to the embodiment of the present invention. FIG. 3B is an enlarged view showing an end portion of the bare cell having the molding portion formed therein in FIG. 3A.

FIG. 3A shows a state that a molding portion 100 is formed at the portion from which the plurality of electrode leads 31 and 32 after the taping operation is performed using the tape 40. The molding portion 100 may be formed by disposing the bare cell 10 subjected to the taping operation at a mold and injecting hot-melt resin into the mold. As described above, the molding portion 100 may be formed at the bare cell 10, so that the bare cell 10 does not require a separate insulating member. That is, a meal layer may be included in the inner surface of the outer casing of the bare cell 10. Therefore, in a case where the metal layer is exposed to the exterior of the outer casing, a short circuit may occur due to the contact between the electrode lead and the metal layer. On the other hand, the bare cell 10 according to this embodiment is provided with the molding portion 100 made of an insulative material, and thus, the attaching process of a separate insulating member can be omitted.

In this embodiment, the molding portion 100 may be formed by molding a polymer resin. For example, the polymer resin may include a polyolefin-based resin, a polyester-based resin, and the like. The polyolefin-based resin may include polypropylene, polyethylene, ethylene-propylene copolymer, polyethylene-acrylic acid copolymer, polypropylene-acrylic acid copolymer, and the like. The polyester-based resin may include polyethylene terephthalate, polybutylene terephthalate, polyethylene naphthalate, and the like.

The molding portion 100 may be a portion on which a protection circuit module 50 is mounted, and may include a base 110 formed on the mounting space 11 (see FIG. 2) and a sidewall portion 113 formed at a portion at which the plurality of electrode leads 31 and 32 are positioned. The protection circuit module 50 may be mounted on the base 110, and a top case 60 may be coupled to the molding portion 100 at the top of the protection circuit module 50.

The sidewall portion 113 may further include stepped portions 120a and 120b respectively formed at the portions from which the plurality of electrode leads 31 and 32. The outer surface side of the stepped portion 120 may be higher than the inner surface side of the stepped portion 120, at which the electrode leads 31 and 32 are extracted and bent, so that the electrode leads 31 and 32 can be easily bent.

The sidewall portion 113 may further include cutout portions 130 and 140 respectively formed at both sides of the stepped portions 120a and 120b that are regions in which the electrode leads 31 and 32 may be positioned. That is, the cutout portions 130 and 140 may be respectively provided at both the sides from which the electrode leads 31 and 32 are extracted so that the electrode leads 31 and 32 can be moved. More specifically, two cutout portions 130a and 130b may be provided to both the sides of the region in which the electrode lead 31 is positioned, respectively, and two cutout portions 140a and 140b may be provided to both the sides of the region in which the electrode lead 32 is positioned, respectively. The cutout portions 130a, 130b, 140a and 140b may be formed by cutting out the sidewall portion 113 with a fixed structure. Thus, the regions of the sidewall portion 11, in which the electrode leads 31 and 32 may be respectively provided between the cutout portions 130a, 130b, 140a and 140b, can be moved while having a constant clearance.

The regions of the sidewall portion 113, in which the cutout portions 130 and 140 are respectively positioned, can be moved while having the clearance, so that when the bare cell 10 and the protection circuit module 50 are joined together, the plurality of electrode leads 31 and 32 of the bare cell 10 and a plurality of protruded electrode terminals 51 and 52 can be more easily connected through contacts, respectively. In a case where the cutout portions 130a, 130b, 140a and 140b are not provided to the sidewall portion 113, the sidewall portion 113 formed through molding does not moved in the state that it is fixed, and therefore, it may be difficult to perform the connection of the electrode leads 31 and 32 through contact with the protection circuit module 50.

In this embodiment, a top portion including the top case 60 for surrounding the protection circuit module 50 may be provided with one or more protruded electrode terminals 51 and 52, so that the electrode terminals 51 and 52 can be electrically connected to the electrode leads 31 and 32 of the bare cell 10 through a physical adhesion structure, respectively. The electrode leads 51 and 52 are formed to be extended from one side of the protection circuit module 50. The electrode leads 51 and 52 may be formed of an elastic body such as a spring or leaf spring in a protruded shape so that the electrode leads 31 and 32 can easily come in contact with the electrode leads 51 and 52, respectively. In this embodiment, the physical adhesion structure does not means a chemical contact such as welding or adhesion but means a physical contact such as elasticity or compression. Thus, when the electrode leads 31 and 32 of the bare cell 10 to the protection circuit module 50, a separate welding operation is unnecessary, thereby doubling the efficiency of processes. The electrode terminals 51 and 52 are formed to be protruded in the state that the electrode leads 31 and 32 are bent, and the electrode terminals 51 and 52 made of the elastic body compress the electrode leads 31 and 32 from the inside to the outside of the molding portion 100, respectively, thereby forming the physical adhesion structure. Thus, the electrode terminals 51 and 52 may be electrically connected to the electrode leads 31 and 32, respectively. Since the external top case 60 has a shape that surrounds the protection circuit module 50 and the sidewall portion 113 of the molding portion 100, it is possible to perform a reliable electrical connection without welding.

Meanwhile, one or more support portions 111 and 112 are provided both sides of the base 110, respectively, so that the protection circuit module 50 can be more easily mounted on the base 110 of the molding portion 100. When the protection circuit module 50 is mounted on the base 110 of the molding portion 100, the support portions 111 and 112 may be used to support the protection circuit module 50 from both sides of the protection circuit module 50 and to prevent the reverse insertion of the protection circuit module 50. To this end, a recess 115 may be formed at one end portion of the protection circuit module 50, and a reverse-insertion preventing rib 114 inserted while being matched with the recess 115 may be formed on the support portion 112 of the base 110, corresponding to the recess 115.

The recess 115 and the reverse-insertion preventing rib 114 may be formed at the support portion 112 and the protection circuit module 50, respectively. Preferably, the recess 115 is formed at the one end portion of the protection circuit module 50, and the reverse-insertion preventing rib 114 is formed on the support portion 112.

One or more fastening projections 150 may be formed on the outer surface of the sidewall portion 113 of the molding portion 100, so that they can be firmly coupled to one or more fastening grooves (now shown) formed in the inner surface of the top case 60.

Figure 4A:
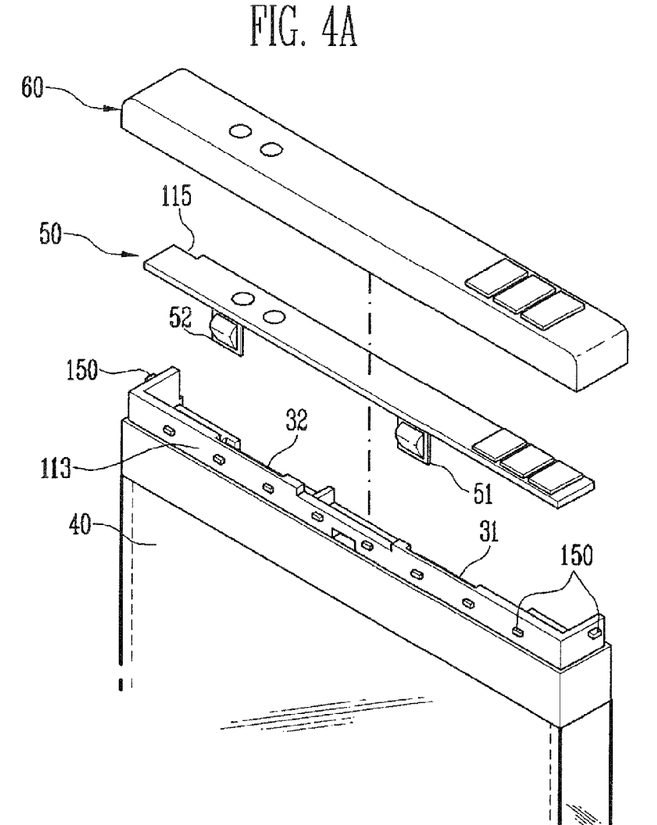
FIG. 4A is a schematic perspective view showing a state that a bare cell provided with a molding portion, a protection circuit module and a case are joined together according to the embodiment of the present invention.
Figure 4B:
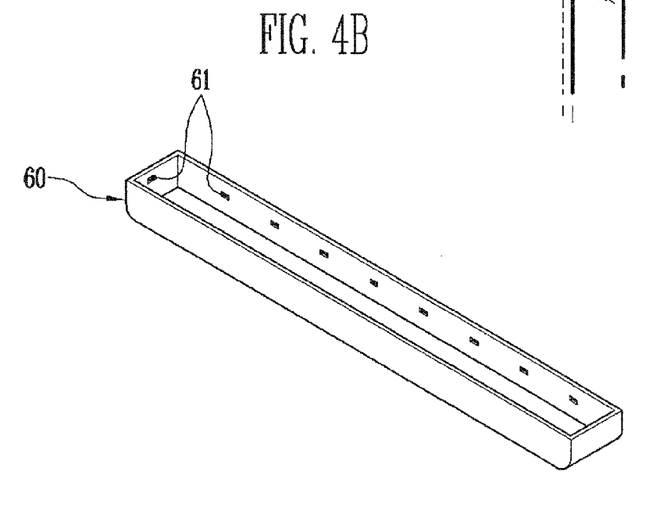
FIG. 4B is a perspective view showing inner surfaces of the case of FIG. 4A.

FIG. 4A is a schematic perspective view showing a state that the bare cell provided with the molding portion, the protection circuit module and the case are joined together according to the embodiment of the present invention. FIG. 4B is a perspective view showing inner surfaces of the case of FIG. 4A.

Referring to FIGS. 4A and 4B, the protection circuit module 50 is surrounded by the top case 60, and the top portion including the top case 60 for surrounding the protection circuit module 50 is joined with the molding portion 100 of the bare cell 10. More specifically, the one or more fastening projections 150 formed on the sidewall portion 113 of the molding portion 100 may be coupled to the one or more fastening grooves formed in the inner surface of the top case 60, respectively. In these figures, the fastening projections 150 are provided to the sidewall portion 113, and the fastening grooves 61 respectively fastened and coupled to the fastening projections 150 are formed in the top case 60. However, the fastening projections 150 may be provided to the top case 60, and the fastening grooves 61 may be formed in the sidewall portion 130. Here, the fastening projections 150 and the fastening grooves 61 are used so that the top case 60 may be easily fastened to the molding portion 100. The shapes of the fastening projections 150 and the fastening grooves 61 are not limited to projections and grooves. That is, after the top case 60 is fastened to the molding portion 100 using a hook or forcible-insertion manner, a finishing operation may be performed using labeling.

Figure 5:
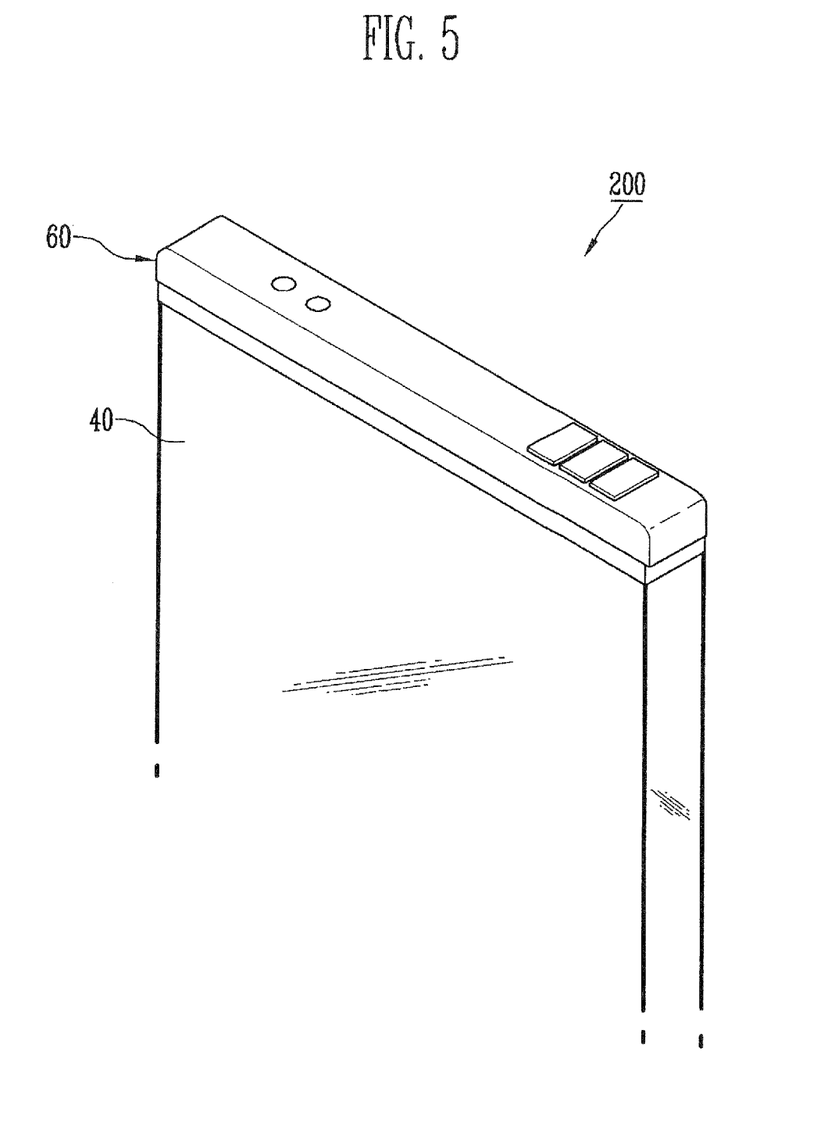
FIG. 5 is a perspective view of the battery pack according to the embodiment of the present invention.

FIG. 5 is a perspective view of the finally assembled battery pack according to the embodiment of the present invention.

The molding portion 100 according to this embodiment includes the base 110 on which the protection circuit module 50 is mounted and the sidewall portion 113 extended from the base 110. The sidewall portion 113 may be a region in which the plurality of electrode leads 31 and 32 are extracted. The protruded electrode terminals 51 and 52 formed on the protection circuit module 50 may be electrically connected to the electrode leads 31 and 32 through compression in the interior of the top case 60, respectively. The top case 60 may be joined with the molding portion 100 while surrounding the protection circuit module 50, the sidewall portion 113 and base 110 of the molding portion 100. In the battery pack 200 of FIG. 5, a taping operation is performed with respect to the entire outer circumferential surface of the bare cell 10 using the tape 40.

Figure 6:
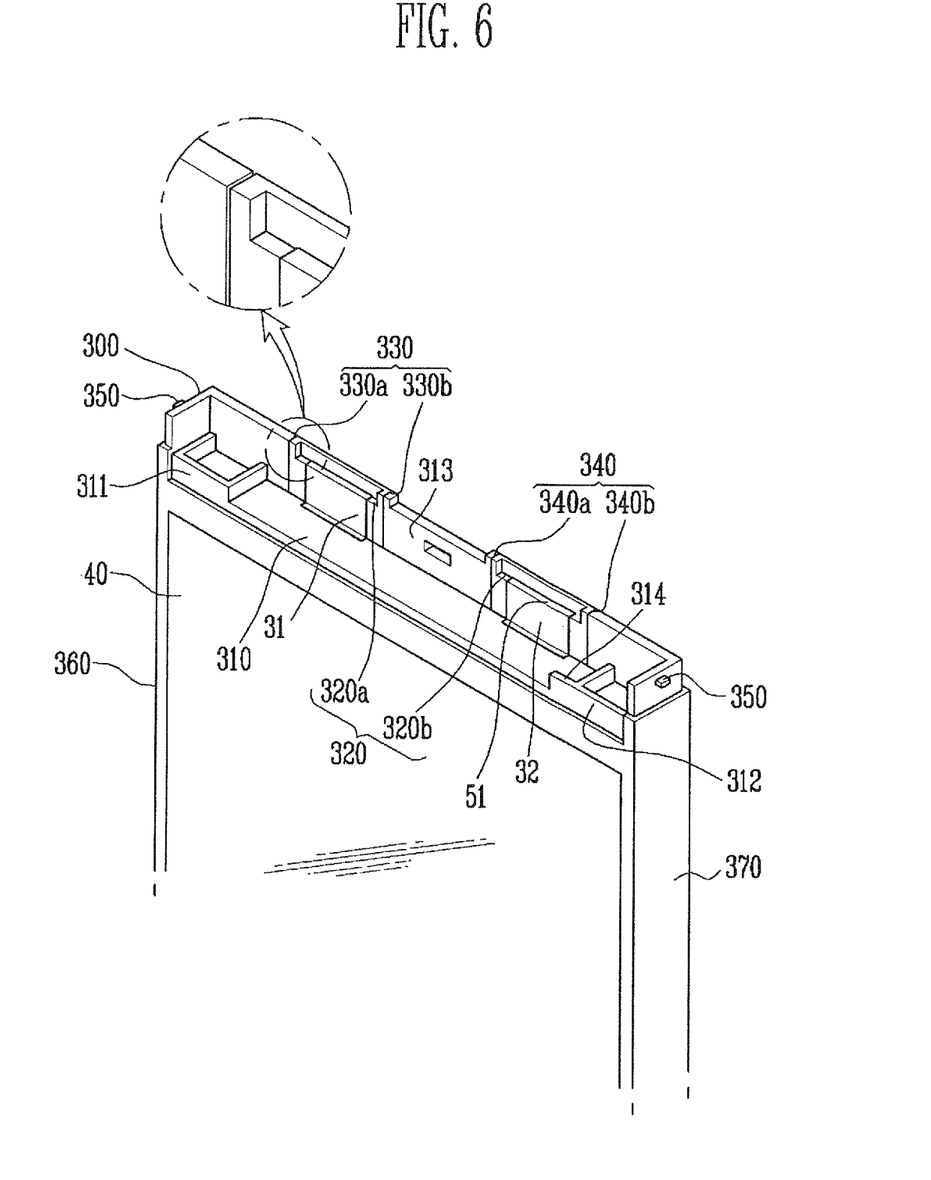
FIG. 6 is a perspective view of a bare cell provided with a molding portion according to another embodiment of the present invention.
Figure 7:
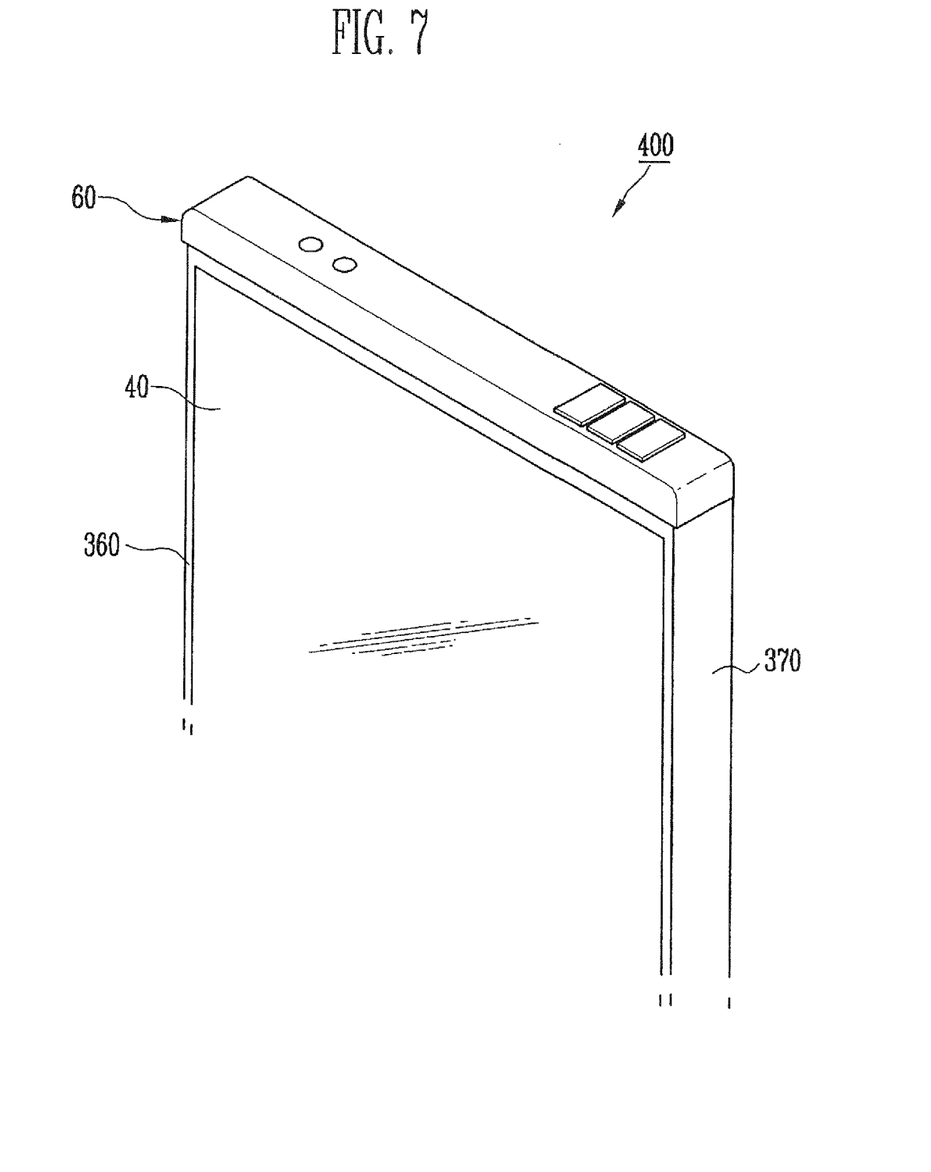
FIG. 7 is a perspective view of a battery pack according to the embodiment of the present invention.

FIG. 6 is an inner perspective view of a battery pack according to another embodiment of the present invention. FIG. 7 is an outer perspective view of the battery pack according to the embodiment of the present invention.

In the battery pack 400 according to this embodiment, the basic structures of the bare cell, the protection circuit module and the top case are identical to those of the aforementioned embodiment, and therefore, their detailed descriptions will be omitted. However, in the battery pack 400 according to this embodiment, a molding portion 300 includes a base 310 and a sidewall portion 313 (see FIG. 3A), and may further include a pair of side portions 360 and 370 respectively formed to be extended in a length direction of the battery pack 400 from both ends of the base 310 and sidewall portion 313.

The molding portion 300 may be formed after a taping operation is performed using the tape 40 as shown in FIG. 2. At this time, the molding portion 300 includes not only the base 310 that is a portion on which the protection circuit module 50 is mounted, but also the sidewall portion 313 that is a region in which the plurality of electrode leads 31 and 32 are extracted, and the side portions 360 and 370 respectively extended in the length direction of the battery pack 400 from both the ends of the base 310 and sidewall portion 313.

As described above, the molding portion 300 may be formed using hot-melt resin through a typical manner. In the battery pack 400 according to this embodiment, the molding portion 300 may be formed to be extended to both sides of the bare cell, so that the entire outer surface of the bare cell can be more firmly formed. Meanwhile, the molding portion 300 may be formed in the shape of a frame formed to be extended to a bottom portion of the bare cell. However, the region of the molding portion 300 causes an increase of the entire volume of the molding portion 300, and therefore, the molding portion 300 is preferably formed in consideration of the increase of the volume and the entire strength of the battery pack 400.

Like the aforementioned embodiment, the base 310 may include support portion 311 and 312, stepped portions 320a and 320b, and cutout portions 330a, 330b, 340a and 340b. A plurality of fastening projections 350 may be formed on the outer surface of the sidewall portion 313. A reverse-insertion preventing rib 314 may be formed on any one of the support portions 311 and 312 so that the protection circuit module 50 is fastened to the molding portion 300 while the reverse-insertion preventing rib 314 is matched with a recess 115 formed at the protection circuit module 50. Thus, it is possible to prevent the reverse insertion of the protection circuit module 50. The structures and operations of the stepped portions 320a and 320b and the cutout portions 330a, 330b, 340a and 340b are identical to those of the aforementioned embodiment, and therefore, their detailed descriptions will be omitted.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A pouch-type battery pack, comprising:
    a bare cell having an interior and an exterior with one or more electrode leads extending to the exterior of the bare cell, said one or more electrode leads being elastic bodies;
    a molding portion formed at one side of the bare cell, said molding portion having one or more cutout portions from which the one or more electrode leads extends; and
    a top portion having a protection circuit module electrically connected to the bare cell,
    wherein the one or more electrode leads are bent over and cover a portion of one or more cutout portions,
    wherein the top portion has one or more electrode terminals in physical contact with the one or more electrode leads of the bare cell,
    wherein said cutout portion is elastic and moves in response to contact with the one or more electrode leads, and
    wherein the molding portion comprises a base on which the protection circuit module is mounted, and a sidewall portion that extends from the base and the sidewall portion includes one or more holes in which the one or more electrode leads extend,
    wherein the shape of the holes corresponding to the shape of the electrode leads.

2. The pouch-type battery pack according to claim 1, wherein the one or more electrode leads of the bare cell are elastically adhered to the one or more electrode terminals in the state that they are bent.

3. The pouch-type battery pack according to claim 2, wherein the one or more electrode terminals are elastic bodies formed to protrude toward the one or more electrode leads.

4. The pouch-type battery pack according to claim 1, wherein the top portion comprises a top case that surrounds the protection circuit module.

5. The pouch-type battery pack according to claim 4, wherein the one or more electrode terminals are formed to extend from one side of the protection circuit module.

6. The pouch-type battery pack according to claim 1, wherein the sidewall portion is provided with one or more stepped portions on the region in which the one or more electrode leads extend so that the one or more electrode leads are easily bent.

7. The pouch-type battery pack according to claim 1, wherein the sidewall portion is fastened and coupled to the top case.

8. The pouch-type battery pack according to claim 1, wherein the molding portion is provided with one or more fastening projections or grooves through which the molding portion is fastened with the top case.

9. The pouch-type battery pack according to claim 8, wherein the top case is provided with one or more fastening grooves or projections respectively formed at positions corresponding to the one or more fastening projections or grooves of the sidewall portion.

10. The pouch-type battery pack according to claim 8, wherein the one or more fastening projections or grooves are formed at the outer surface of the sidewall portion in the molding portion.

11. The pouch-type battery pack according to claim 1, wherein the base is provided with one or more support portions that support the protection circuit module.

12. The pouch-type battery pack according to claim 11, wherein a reverse-insertion preventing rib is formed on the one or more support portions, and a recess is formed at a position corresponding to the reverse-insertion preventing rib in the protection circuit module so that the reverse-insertion preventing rib is coupled to the recess while being matched with the recess.

13. The pouch-type battery pack according to claim 1, wherein the cutout portion is provided to both sides of the region in which the one or more electrode leads extend.

14. The pouch-type battery pack according to claim 13, wherein the sidewall portion having the cutout portion positioned therein enables the one or more electrode leads of the protection circuit module to be moved when the one or more electrode leads come in contact with the one or more electrode leads.

15. The pouch-type battery pack according to claim 1, wherein the molding portion further comprises one or more side portions extend in the length direction of the bare cell from the base and the sidewall portion.

16. The pouch-type battery pack according to claim 15, wherein the molding portion is formed in the shape of a frame formed to be extended to a bottom portion of the bare cell.

17. The pouch-type battery pack according to claim 1, wherein the molding portion is made of at least one selected from the group consisting of polyolefin-based resin and polyester-based resin.

18. The pouch-type battery pack according to claim 17, wherein the polyolefin-based resin is made of one or more selected from the group consisting of polypropylene, polyethylene, ethylene-propylene copolymer, polyethylene-acrylic acid copolymer and polypropylene-acrylic acid copolymer.

19. The pouch-type battery pack according to claim 17, wherein the polyester-based resin is made of one or more selected from the group consisting of polyethylene terephthalate, polybutylene terephthalate and polyethylene naphthalate.

\* \* \* \* \*